Sept. 21, 1948.  L. L. PRITCHARD  2,449,618
FOLDABLE CART AND CAR SEAT
Filed Jan. 31, 1947  2 Sheets-Sheet 1
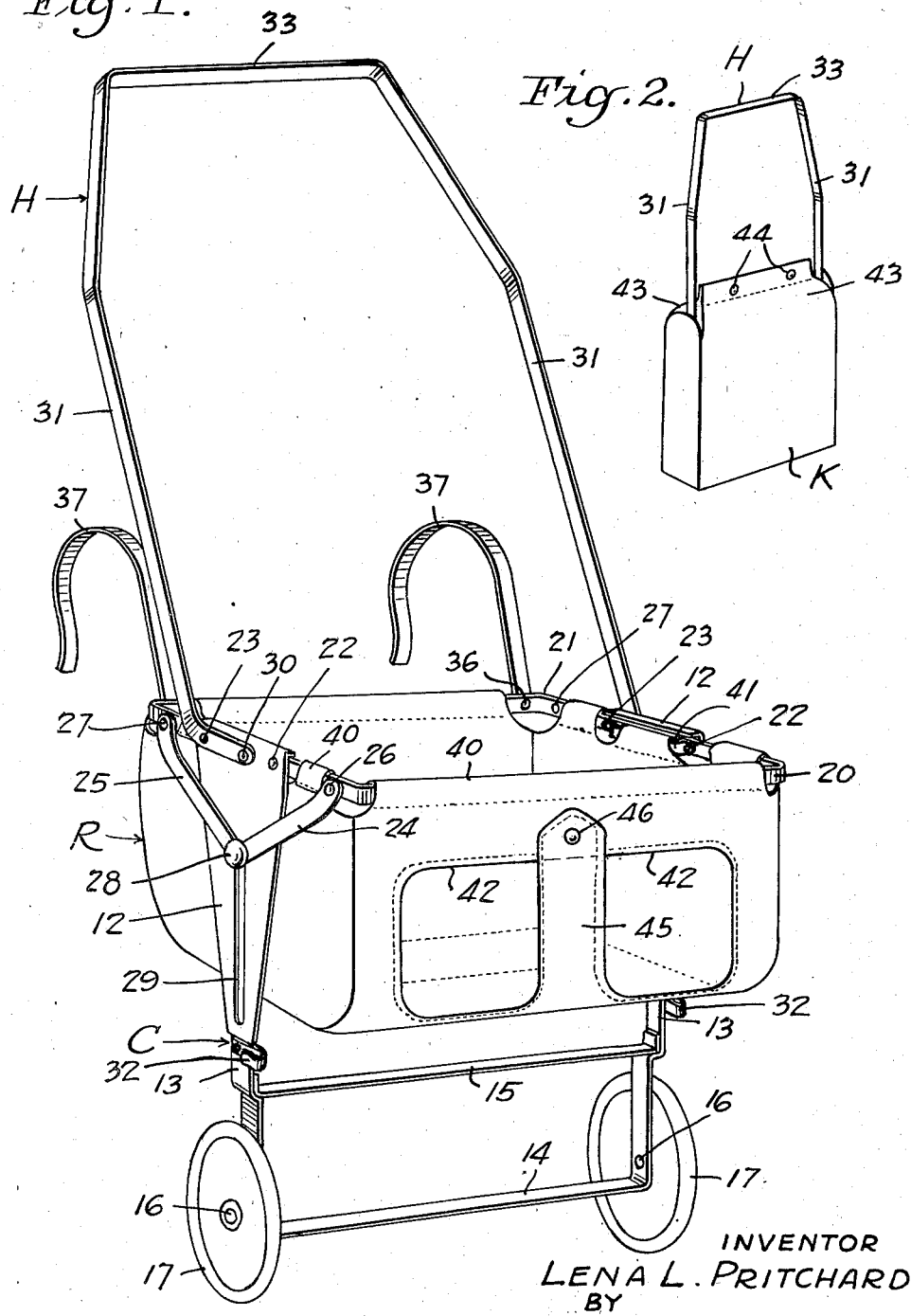
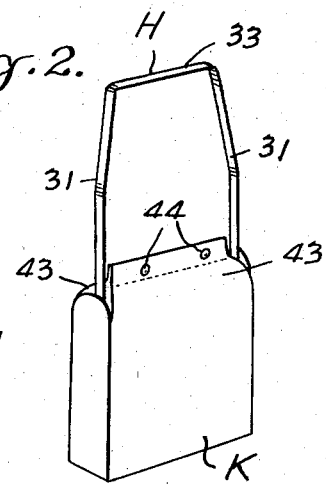
INVENTOR
LENA L. PRITCHARD
BY
Frederick Diehl
ATTORNEY Sept. 21, 1948.   L. L. PRITCHARD   2,449,618
FOLDABLE CART AND CAR SEAT
Filed Jan. 31, 1947   2 Sheets-Sheet 2

INVENTOR
LENA L. PRITCHARD
BY
Frederick Diehl
ATTORNEY

Patented Sept. 21, 1948

2,449,618

UNITED STATES PATENT OFFICE 2,449,618

FOLDABLE CART AND CAR SEAT

Lena L. Pritchard, Los Angeles, Calif.

Application January 31, 1947, Serial No. 725,469

6 Claims. (Cl. 280—36)

1

This invention relates generally to vehicles and chairs for infants and small children.

An object of this invention is to provide a device of simple, durable and inexpensive construction which is structurally characterized to enable it to be wheeled about to function as a stroller or article carrier so as to conveniently transport a child or packages, or to function as a seat for the child while traveling in an automobile, all while rendering the device readily foldable into a relatively flat, compact and lightweight parcel capable of being enclosed in a cover or case for ease in carrying the device by its handle.

Another object of this invention is to provide a device of the above described character which includes a two-wheel chassis having pivotally mounted frame members which, when extended, rigidly support a flexible receptacle for the child or packages, and which, when collapsed, permits the device to fold compactly, with the handle of the device being adjustable from one position to wheel the device thereby, to a second position for convenient carrying of the folded device by its handle.

A further object of this invention is to provide a device as above set forth, in which hook members are mounted on one of the frame members of the chassis to occupy an active position wherein they are adapted to be hooked over the back of an automobile seat to support the device therefrom, or to occupy an inactive position for folding of the structure into the compact parcel.

With these and other objects in view, the invention resides in the combinations, arrangements and functional relationships of elements as set forth in the following specification and particularly pointed out in the appended claims.

In the accompanying drawings,

Figure 1 is a perspective view showing the invention extended or set up for use as a cart to transport a child or a number of articles;

Figure 2 is a perspective view of the invention folded and enclosed in a slip cover or case for carrying;

Figure 3:
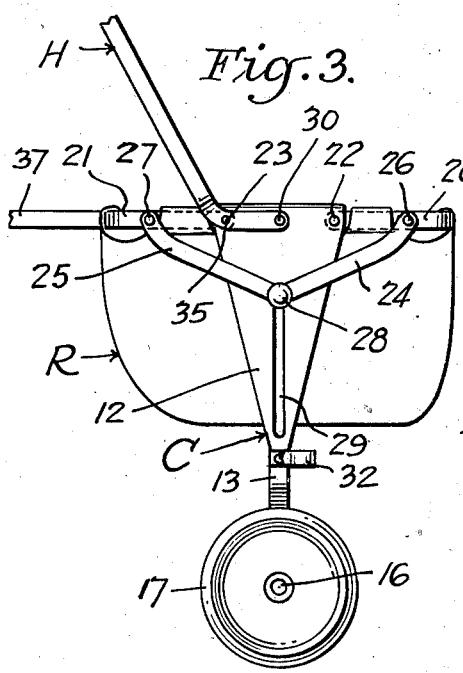
Figure 3 is a view in side elevation showing the invention extended.

Referring specifically to the drawings, the invention in its illustrated embodiment broadly

2 comprises a chassis C and a receptacle R supported thereby. The chassis C is composed of a fixed frame and a foldable frame, the fixed frame having side plates 12 of generally acute triangular outline, and legs 13 extending from the apex end thereof and rigidly connected at their extremities by a tie bar 14, and at intermediate points by a brace bar 15. Projecting from the legs 13 adjacent to the tie bar 14 are stub axles 16 on which wheels 17 are rotatably mounted.

The movable frame of the chassis C comprises front and rear frame members 20 and 21 of U shape in plan, whose parallel side arms are pivotally mounted at their free ends on the plates 12 close to the larger end of the latter, by pins 22 and 23, respectively. By this mounting means, the frame members 20 and 21 are rendered adjustable from the extended position shown in Figures 1, 3 and 4 wherein the members co-act with the plates in defining a frame of rectangular outline from which the receptacle R is suspended, to the folded position shown in Figure 5 wherein the members are disposed in parallelism at opposite sides of the plates.

Guide links 24 and 25 are pivotally connected at one end by pins 26 and 27 to the side arms of the frame members 20 and 21, respectively, and are pivotally connected together at their other ends by knob-headed pins 28 working in slots 29 in the plates 12 to guide the frame members symmetrically and brace them when occupying extended position.

Pivotally mounted on the plates 12 by pins 30 medially between the pins 26 and 27 are the side members 31 of a U-shaped handle H providing a handle bar 33 (Figures 1 and 2) adapted to be grasped by the operator when the handle is swung about the pins 30 to the extended position shown in Figures 1 and 3 wherein the handle extends upwardly and rearwardly of the chassis. The handle H is adapted to be swung about the pins 30 to the folded position shown in Figure 5 wherein the side members 31 of the handle receive the folded chassis therebetween to form a flat, compact parcel.

The rear pivot pins 23 project outwardly from the plates 12 to provide latch lugs over which the side members 31 of the handle H are adapted to be sprung for the pins to enter openings 35 (Figures 5 and 6) in the side members, so as to latch the handle in its extended position. Spring clips 32 are secured to the legs 13 for co-action with the side members 31 of the handle in releasably retaining the handle securely in folded position.

Figure 5:
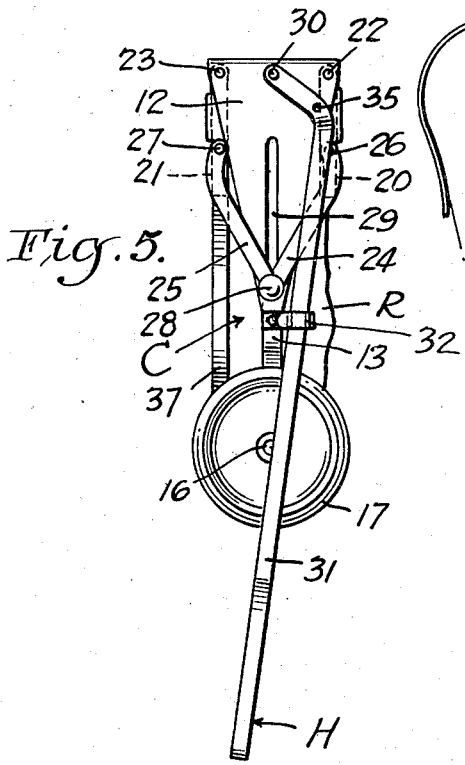
Figure 5 is a view in side elevation showing the invention folded.
Figure 6:
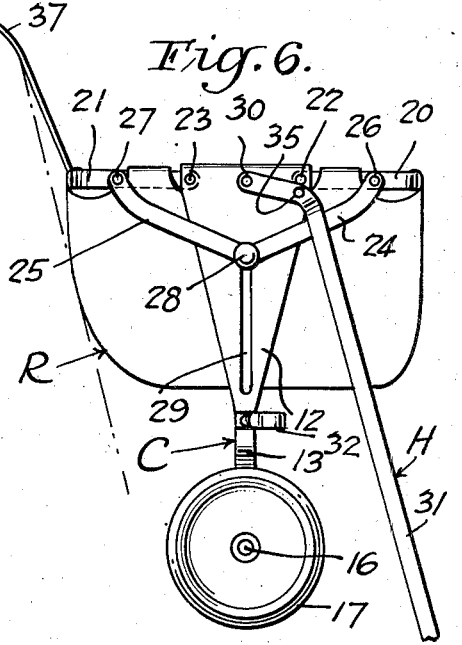
Figure 6 is a view similar to Figure 3, with certain parts of the invention adjusted for use of the latter as an auxiliary seat in an automobile.

Pivotally mounted by pins 36 on the connecting bar of the rear frame member 21 are hangers in the form of downwardly opening hooks 37 which are adapted to be hooked over the back of an automobile seat to support the chassis C therefrom as shown in Figure 6. When not in use, the hooks 37 are adapted to be swung about the pins 36 to the position shown in Figure 5 wherein the hooks and frame member 21 are in co-planar relationship to provide the compact parcel.

The receptacle R may be constructed of suitable strong fabric of several pieces sewed together to form an open-topped container of generally rectangular form whose upper edges are looped over the frame members 20 and 21 as indicated at 40 and then sewed to the body of the receptacle to permanently secure the latter to the chassis. Opposite the inner sides of the plates 12 and secured thereto are straps 41 over which portions of the receptacle are looped and sewed. The front wall of the receptacle R is provided with suitable openings 42 through which the legs of a child are passed when seating the child in the receptacle.

A suitable slip cover or case K (Figure 2) may be provided to receive the device when folded as shown in Figure 5. The case K has an open side controlled by flaps 43 latched closed by separable fasteners 44, with the side members 31 of the handle H projecting from the case at the ends of the flaps 43 so as to expose the handle bar 33 for grasping by the operator in order to enable the neat, compact parcel formed by the folded device and case, to be conveniently carried by hand or suspended from the shoulder when carrying the child.

It will be clear that with the device extended as shown in Figure 1, a child placed in the receptacle R can be conveniently wheeled about with a minimum of effort, and that when not in use the device can be quickly folded into the small flat parcel shown in Figure 5, and inserted into case K for convenient carrying by the handle H. With the hooks 37 adjusted to the position for use shown in Figure 6, and the handle H swung downwardly, the device can be securely hung from the back of an automobile seat and may be braced by engaging the handle bar 33 of the handle H with the seat, so as to safely and comfortably support the child in the automobile.

Figure 4:
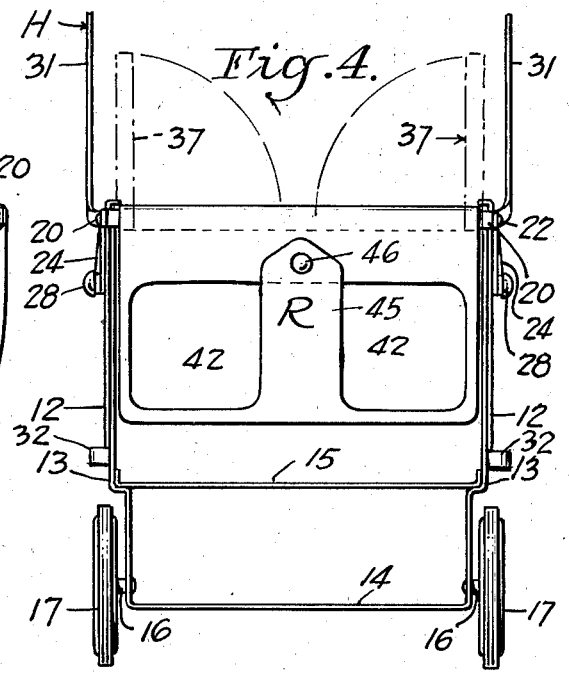
Figure 4 is a view in front elevation showing the invention extended.

As shown in Figures 1 and 4, the front wall of the receptacle R may be constructed so that the web of material between the leg openings 42 is in the form of a drop flap 45 the upper end of which is detachably secured to the front wall by a suitable separable fastener 46. By this construction, the removal of the child's legs from the openings 42 is greatly facilitated by dropping the flap so as to form a single opening through which the legs can be withdrawn without dragging upon the material of the receptacle and possibly turning the forward portion thereof inside out.

I claim:

1. A device of the class described comprising: a two-wheeled frame; front and rear U-shaped frame members pivotally mounted on said frame to occupy an extended position wherein they co-act to form a rectangular frame, and a folded position wherein the members are disposed flatly at opposite sides of said wheeled frame to co-act therewith in forming a flat, compact parcel; links pivotally connected at one end to said frame members and pivotally connected together at the other end with a pin and slot connection of the latter with said wheeled frame so as to symmetrically guide and brace the frame members; an open-topped flexible receptacle supported by said frame members; and a U-shaped handle having side members pivotally mounted on said wheeled frame for adjustment of the handle to occupy an extended position for grasping by an operator to wheel the device about, or a folded position wherein the wheeled frame and frame members when folded, are received between the side members of the handle for carrying of the device by the handle.

2. A device of the class described comprising: a two-wheeled frame; front and rear U-shaped frame members pivotally mounted on said frame to occupy an extended position wherein they co-act to form a rectangular frame, and a folded position wherein the members are disposed flatly at opposite sides of said wheeled frame to co-act therewith in forming a flat, compact parcel; links pivotally connected at one end to said frame members and pivotally connected together at the other end with a pin and slot connection of the latter with said wheeled frame so as to symmetrically guide and brace the frame members; an open-topped flexible receptacle supported by said frame members; a U-shaped handle having side members pivotally mounted on said frame for adjustment of the handle to occupy an extended position for grasping by an operator to wheel the device about, and a folded position wherein the wheeled frame and frame members when folded, are received between the side members of the handle for carrying of the device by the handle; and hook members pivotally mounted on said rear frame members to occupy a position for use in supporting the device from a seat back, and a non-use position wherein the hook members are disposed at the side of said wheeled frame when the frame members occupy folded position.

3. A device of the class described comprising: a fixed frame composed of two elongated side plates and rigidly connected wheel-carrying legs extending from one end of said plates; front and rear U-shaped frame members pivotally mounted on said plates to co-act therewith in defining a foldable rectangular frame; said plates having guide slots; links pivotally connected at one end by pins working in said slots; means pivotally connecting the other ends of the links to said front and rear frame members, respectively, to symmetrically guide and brace the latter; an open-topped flexible receptacle supported by said frame members; a U-shaped handle having side members pivotally mounted on said fixed frame for adjustment of the handle to occupy an extended position for grasping by an operator to wheel the device about, and a folded position wherein the fixed frame and frame members when folded at opposite sides of the fixed frame, are received between the side members of the handle for carrying of the device thereby; and co-acting means on the fixed frame and handle for releasably retaining the latter in extended position.

4. A device of the class described comprising: a fixed frame composed of two elongated side plates and rigidly connected wheel-carrying legs extending from one end of said plates; front and rear U-shaped frame members pivotally mounted on said plates to co-act therewith in defining a foldable rectangular frame; said plates having guide slots; links pivotally connected at one end by pins working in said slots; means pivotally connecting the other ends of the links to said front and rear frame members, respectively, to symmetrically guide and brace the latter; an open-topped flexible receptacle supported by said frame members; a U-shaped handle having side members pivotally mounted on said fixed frame for adjustment of the handle to occupy an extended position for grasping by an operator to wheel the device about, and a folded position wherein the fixed frame and frame members when folded at opposite sides of the fixed frame, are received between the side members of the handle for carrying of the device thereby; co-acting means on the fixed frame and handle for releasably retaining the latter in extended position; a pair of U-shaped hook members; and means pivotally mounting the hook members on the rear frame members to occupy a position for use in supporting the device from a seat back, and a non-use position wherein the hook members are disposed flatly in co-planar relationship to said frame members when occupying folded position.

5. A device of the class described comprising: a fixed frame composed of two elongated side plates and rigidly connected wheel-carrying legs extending from one end of said plates; front and rear U-shaped frame members pivotally mounted on said plates to co-act therewith in defining a foldable rectangular frame; said plates having guide slots; links pivotally connected at one end by pins working in said slots; means pivotally connecting the other ends of the links to said front and rear frame members, respectively, to symmetrically guide and brace the latter; an open-topped flexible receptacle supported by said frame members; a U-shaped handle having side members pivotally mounted on said fixed frame for adjustment of the handle to occupy an extended position for grasping by an operator to wheel the device about, and a folded position wherein the fixed frame and frame members when folded at opposite sides of the fixed frame, are received between the side members of the handle for carrying of the device thereby; co-acting means on the fixed frame and handle for releasably retaining the latter in extended position; a pair of U-shaped hook members; and means pivotally mounting the hook members on the rear frame members to occupy a position for use in supporting the device from a seat back, and a non-use position wherein the hook members are disposed flatly in co-planar relationship to said frame members when occupying folded position; said handle being adapted, when in folded position, to engage the seat when the hook members are hooked over the back thereof, so as to brace the device against displacement.

6. A device of the class described comprising: a two-wheeled fixed frame; a foldable frame mounted on the fixed frame to occupy an extended position, and a folded position wherein the foldable frame co-acts with the fixed frame to form a flat, compact parcel; a flexible receptacle supported by said frames in receptacle-forming position when the foldable frame is extended; a U-shaped handle having side members pivotally mounted on the fixed frame for adjustment of the handle to one position wherein the handle extends upwardly and rearwardly of the frames for grasping by an operator to wheel the device about, and to another position wherein said frames are received between the side members of the handle and the latter projects beyond the frames, for carrying of the device by the handle; and a pair of hook members movably mounted on said movable frame to occupy one position for use in supporting the device from a seat back, and another position wherein they will be folded flat when the movable frame occupies folded position.

LENA L. PRITCHARD.

REFERENCES CITED

The following references are of record in the file of this patent:

UNITED STATES PATENTS

| Number | Name | Date |
|---|---|---|
| 1,114,314 | Turner | Oct. 20, 1914 |
| 1,252,133 | Martin | Jan. 1, 1918 |
| 1,265,126 | Silver | May 7, 1918 |
| 2,264,121 | Pattiani | Nov. 25, 1941 |